Jan. 20, 1970  J. L. KING  3,490,335

MILLING MACHINE ATTACHMENT

Filed Aug. 28, 1967  3 Sheets-Sheet 1

INVENTOR
JAMES L. KING
BY
Nicholas A. Pendisco
ATTORNEY

Jan. 20, 1970     J. L. KING     3,490,335

MILLING MACHINE ATTACHMENT

Filed Aug. 28, 1967     3 Sheets-Sheet 2

INVENTOR
JAMES L. KING
BY
*Nicholas A. Pandiscio*
ATTORNEY

Jan. 20, 1970   J. L. KING   3,490,335
MILLING MACHINE ATTACHMENT
Filed Aug. 28, 1967   3 Sheets-Sheet 3

INVENTOR
JAMES L. KING
BY
Nicholas A. Pendiscio
ATTORNEY

United States Patent Office 3,490,335
Patented Jan. 20, 1970

3,490,335
MILLING MACHINE ATTACHMENT
James L. King, 2 Ford Road, Sudbury, Mass. 01776
Filed Aug. 28, 1967, Ser. No. 663,881
Int. Cl. B23c *9/00;* B23d *7/08;* F16h *3/34*
U.S. Cl. 90—21                                9 Claims

ABSTRACT OF THE DISCLOSURE

Power feed apparatus adapted for connection with a feed screw of a milling machine including a housing mountable on the machine, a universal motor, a control circuit for controlling the motor speed and direction, a miter box driven by the motor, a first gear rotated on a first axis by the miter box, a second gear rotatable on a second axis parallel to the first axis, and arranged for rotating a feed screw of a milling machine, and an idler gear and a lever rotatably supporting the idler gear for moving the idler gear between a first position in which it engages both the first and second gear and a second position in which it is disengaged from at least one of them.

---

This invention relates to power feed apparatus adapted for use with milling machines and more particularly to such devices having a positive power engagement and disengagement mechanism.

Various power feed devices are available for use with conventional milling machines but each of these devices has significant shortcomings. Many of these devices are large and heavy making them cumbersome and difficult to install. Installation difficulties are often compounded by the complexity of the manner in which the apparatus is mounted to the milling machine and by the manner in which the power connection is made to the feed screw of the machine. Moreover, these power feed devices often interfere with the operation of other parts of the machine, including hand-feeding operations.

In operation, slow and non-uniform speed control contribut to the inaccuracies in feed rate and table positioning. A major shortcoming in many such existing devices is the intermediate clutch arrangement for controlling power transmission to the feed screw.

Accordingly it is a primary object of this invention to provide a power feed apparatus having a positive means for engaging and disengaging the driving power with the feed screw.

It is a further object of this invention to provide such an apparatus which is extremely light weight, small and easy to install in respect to the mounting of the apparatus to the milling machine and in respect to the manner of attaching the drive means to the feed screw, and which when fully installed does not interfere with other machine operations.

It is a further object of this invention to provide such an apparatus having bi-directional uniform speed control, a high feed rate and accurate table positioning capability.

It is a further object of this invention to provide such an apparatus which may also be used as an additional power take-off unit to drive auxiliary equipment for the milling machine and other shop equipment.

The invention is accomplished by power feed apparatus adapted for connection with a feed screw on a milling machine including a housing adapted for mounting on a milling machine, drive means supported by the housing, first power transmission means driven by the drive means, second power tranmsission means spaced from the first power transmission means and arranged for rotating a feed screw of a milling machine, and power applying means for applying the power from the first power transmission means to the second power transmission means.

In the preferred embodiment the first power transmission means includes a first gear rotatable about a first axis, the second power transmission means includes a second gear rotatable about a second axis parallel to the first axis, and the power applying means includes an idler gear and a lever rotatably supporting the idler gear for moving the idler gear between a first position in which it engages both of the first and second gears and a second position in which it is disengaged from at least one of them.

Other objects, features and advantages will appear from the following description of a preferred embodiment of the invention as shown in the attached drawings, in which.

Figure 1:
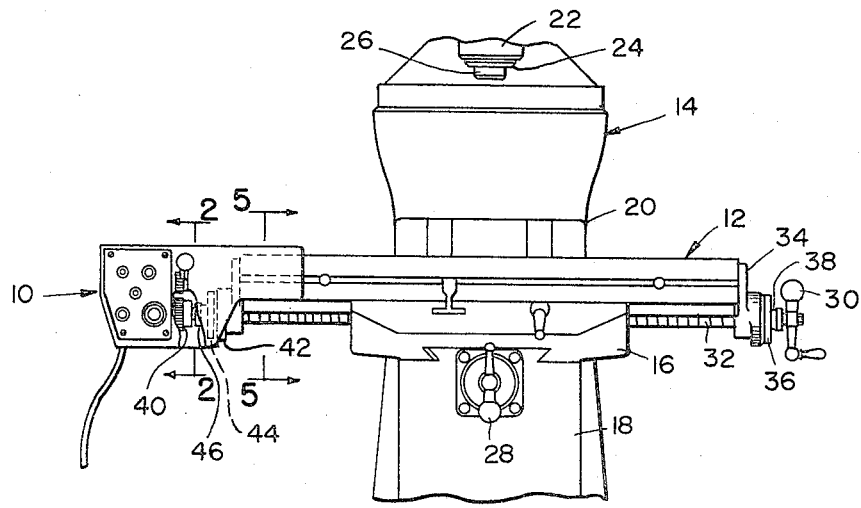
FIG. 1 is a front view of a portion of a typical milling machine having a power feed apparatus according to this invention mounted on the left end of the table.

There is shown in FIG. 1 a power feed device 10 mounted on table 12 of milling machine 14 shown only in part. Table 12 is supported on saddle 16 by knee 18 fastened to column 20. Above table 12 is the lower portion of quill housing 22 which contains quill nosepiece 24 and spindle 26. Table 12 is moved forward and back in FIG. 1 by means of cross-feed ball crank handle 28 which is hand rotatable to drive a cross-feed screw.

The main or longitudinal feed of table 12 is accomplished by means of a ball crank handle 30 fastened to the right end of longitudinal feed screw 32 supported in bearing bracket 34. Dial 36 and dial holder 38 are located between handle 30 and bracket 34.

The ball crank handle normally fastened at the left end of screw 32 has been replaced by gear 40 and this replacement constitutes the only necessary modification for the use of the power feed device 10 with conventional milling machines. Bearing bracket 42, dial 44 and dial holder 46 are retained on the left end of screw 32 when gear 40 is used.

Figure 2:
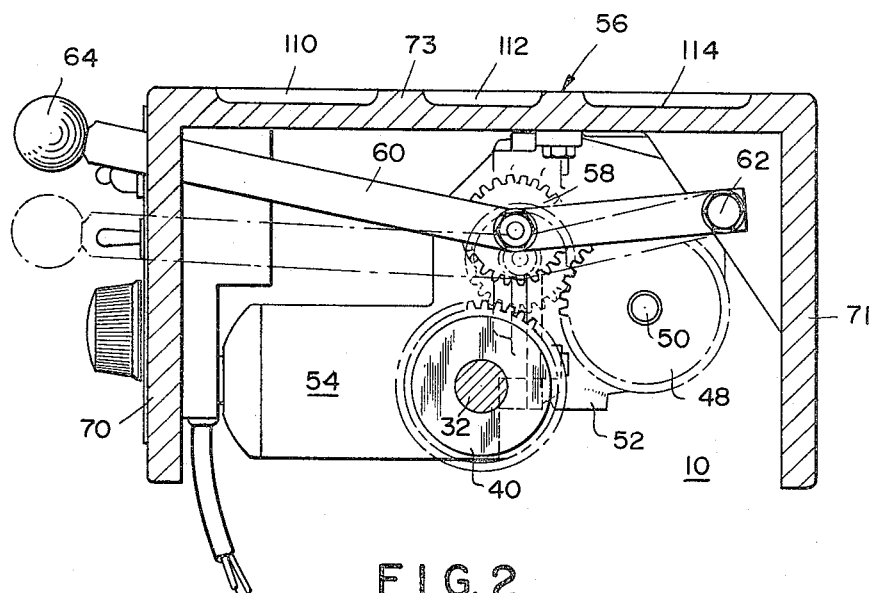
FIG. 2 is a sectional view taken along line 2—2 of FIG. 1 showing the power transmission gears of the power feed device.

As shown in FIG. 2, gear 40 mounted on the end screw 32 is spaced from a drive gear 48 that is mounted on a shaft 50 driven by a miter box 52. As used herein the term "miter box" describes a power transmission gear train which preferably is designed to operate as a speed reduction unit. Miter box 52 is driven by a universal motor 54 and both of them are attached to the housing 56 of device 10. Power at gear 48 is applied to gear 40 by an idler gear 58 rotatably mounted on a crank 60 between its fulcrum or pivot connection to housing 56 by means of a bolt 62 and its handle 64. The latter is attached to the end of crank 60 external to housing 56.

Figure 3:
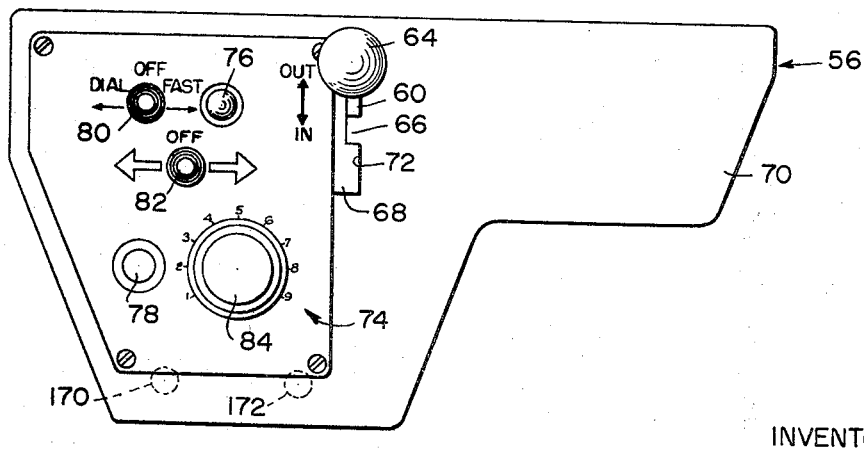
FIG. 3 is a partially broken away enlarged view of the power feed device of FIG. 1, showing its control panel.

In the lower position of crank 60 shown dotted in FIG. 2, gear 58 engages both gears 40 and 48 so that power is transmitted to screw 32; in the upper, full line, position gear 58 is disengaged from both gears 40 and 48 and no power is transmittted to screw 32. Crank 60 is maintained in each of these positions by an interlock tab 66 (FIG. 3) formed on one edge 72 of a slot 68 in a front wall 70 through which extends the portion of crank 60 carrying handle 64. Positive positioning by interlock tab 66 is assured by the bias of crank 60 toward edge 72 of slot 68 from which tab 66 protrudes.

Figure 6:
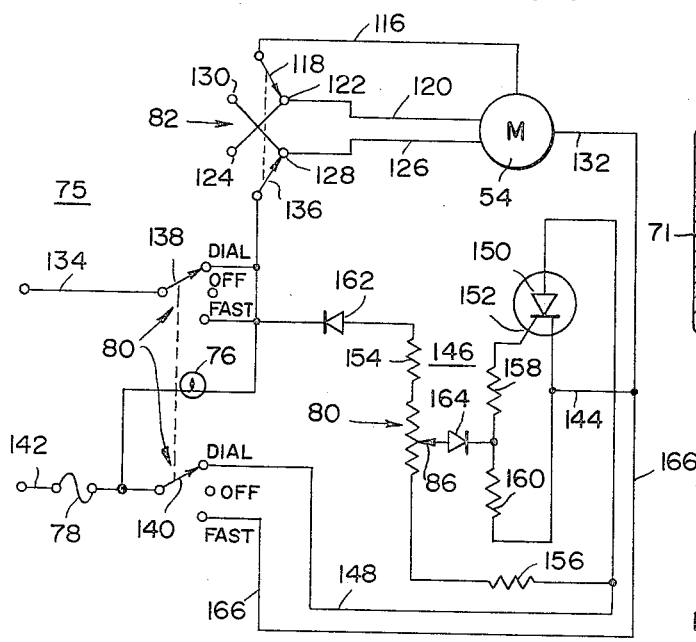
FIG. 6 is a schematic diagram of the motor control circuit.

Adjacent slot 68 on wall 70 is a control panel 74 having: an on-off indicator lamp 76, a main line fuse 78, a toggle switch 80 having three positions (one position labeled "DIAL" for connecting motor 54 for variable speed control, under which control the table speed may be varied from one-half to twelve inches per minute, a second position labeled "OFF" for completely de-energizing motor 54, and a third position labeled "FAST" for connecting motor 54 for non-variable high speed operation); a toggle switch 82 having two positions for setting the direction of rotation of motor 54, thereby also controlling the direction of motion of screw 32 and table 12; and a dial 84 calibrated in terms of table speed and connected to drive wiper 86 of a potentiometer 88 (see FIG. 6).

Figure 4:
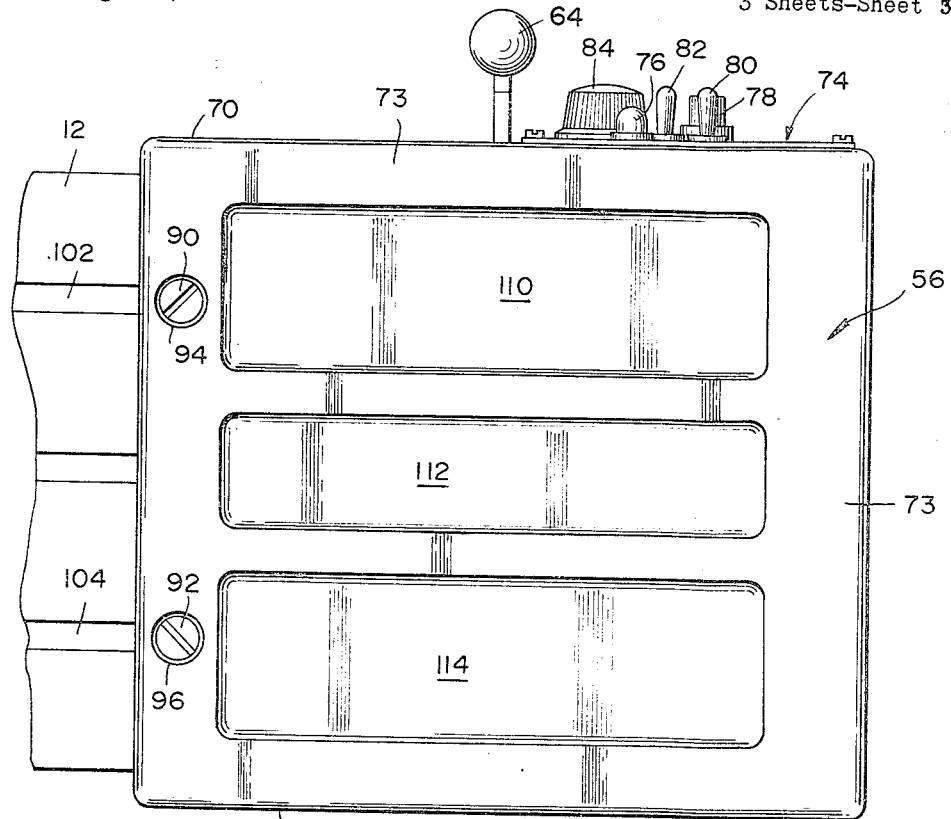
FIG. 4 is a top view of a portion of the milling machine table and the power feed device attached thereto displaying its tool holding recesses.
Figure 5:
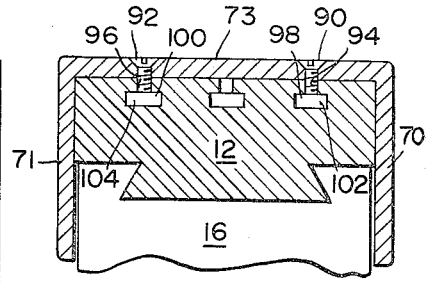
FIG. 5 is a sectional view taken along line 5—5 of FIG. 1 showing the power feed device housing attached to the table.

Housing 56 is of U-shaped cross-section, comprising the aforesaid front wall 70, a rear wall 71 and a top wall 73. It is mounted to table 12 by two bolts 90, 92 (see FIGS. 4 and 5) disposed in countersunk bores 94, 96 and engaging two nuts 98, 100 in T channels 102, 104 respectively. The top wall 73 of housing 56 has three dished portions or recesses 110, 112 and 114 which are available as a tool rest and repository when power feed device 10 is mounted in a position similar to that shown in FIGS. 1 and 4, i.e. with wall 73 horizontal.

The motor control circuit 75 is shown in FIG. 6 where schematic symbols of components are numbered to correspond with the components on control panel 74 which they represent. Universal motor 54 is of the series wound split armature type in which the field winding is connected on line 116 to one blade 118 of switch 82 and the two armature windings are connected one to line 120 and contacts 122, 124 and the other to line 126 and contacts 128, 130; the other end of the field windings are connected to line 132. A second switch blade 136 is ganged to blade 118 and is adapted to make connection alternately to contacts 128 and 130. With switch 82 in the position shown in FIG. 6 the field winding is connected through blade 118 and contact 122 to the armature winding associated with line 120, while the armature winding associated with line 126 is connected to A.C. power line 134 through blades 136 and contact 128. In the other of its positions switch 82 connects the armature winding associated with line 120 through contact 124 and blade 136 and connects the field winding through blade 118 and contact 130 to the armature winding associated with line 126. By means of this transposition the switch 82 controls the direction of rotation of the armature of motor 54. Lamp 76 has one lead connected to the line 142 side of switch 80 and the other to the motor circuit side of switch 80 to provide an indication when power is being applied to the circuit.

Switch 80 has two ganged blades 138, 140 connected A.C. power lines 134 and 142, respectively. In the positon shown in FIG. 6 an energizing path through motor 54 is established via line 134, blade 138, one of the "DIAL" contacts of switch 80, blade 136, contact 128, line 126 and its associated armature winding, line 132, line 144, a silicon controlled rectifier (SCR) circuit 146, line 148, the second "DIAL" contact of switch 80, blade 140, fuse 78, and line 142. The speed of motor 54 is thus controlled by the amount of power passed by the silicon controlled rectifier (SCR) 150 which is in turn controlled by the forward bias on diode 164 and the counter EMF in motor 54. Biasing of diode 164 is provided by potentiometer 88 whose wiper 86 is manipulated by dial 84 on control panel 74. The remainder of SCR circuit 146 includes limiting resistor 154, which is selected to provide zero motor speed when control dial is set at zero, resistor 156, voltage divider resistors 158 and 160, and rectifier diode 162. This circuit assures constant power at lower speeds.

With blades 138 and 140 in the position in which they contact the isolated OFF contacts of switch 80, the motor is unenergized. When blades 138 and 140 are shifted so as to engage the "FAST" contacts of switch 80, a low impedance path on line 166 is provided from line 132 to line 142 and line 148 is disconnected from line 142 so that full line voltage is applied unattenuated across motor 54 for maximum speed operation.

In operation, housing 56 is quickly secured to table 12 by bolts 90 and 92 engaged with nuts 98 and 100 in T channels 102 and 104, respectively, gear 40 is attached to screw 32, and handle 64 is pushed downward until lever 60 is locked in slot 68 below tab 66, so that gear 58 is engaged with gears 40 and 48. Dial 84 is now set to the desired table speed and switch 82 is set to the desired direction of table movement as indicated by the arrows on either side of switch 82 on control panel 74. Finally, switch 80 is moved to the DIAL position so that the SCR circuit 146 controls the power through motor 54 in accordance with the setting of wiper 86 controlled by dial 84.

Motor 54 is now driving miter box 52 which in turn is driving gear 48 on shaft 50. The power is transmitted from gear 48 through idler gear 58 to gear 40 on feed screw 32, thereby rotating screw 32 and moving table 12 across the milling machine. The human operator may now be released for other work such as setting up additional power feed devices on other milling machines while the instant device moves table 12. At the end of the travel of table 12 the operator moves switch 82 to its other position, reversing the direction of movement of table 12 and then may either leave switch 80 on the DIAL position, in which case table 12 will be moved to its original position at the speed selected on dial 84, or move switch 80 to the FAST position so that table 12 is rapidly returned to its original position at the highest speed possible but without disturbing the setting on dial 84.

It should be appreciated that device 10 may be made to operate automatically without aid of an operator by employing a programming apparatus including a timer and/or limit switch ot reverse table travel direction when it reaches the end of its travel in either direction and to instruct dialed speed or high speed return rates.

Figure 7:
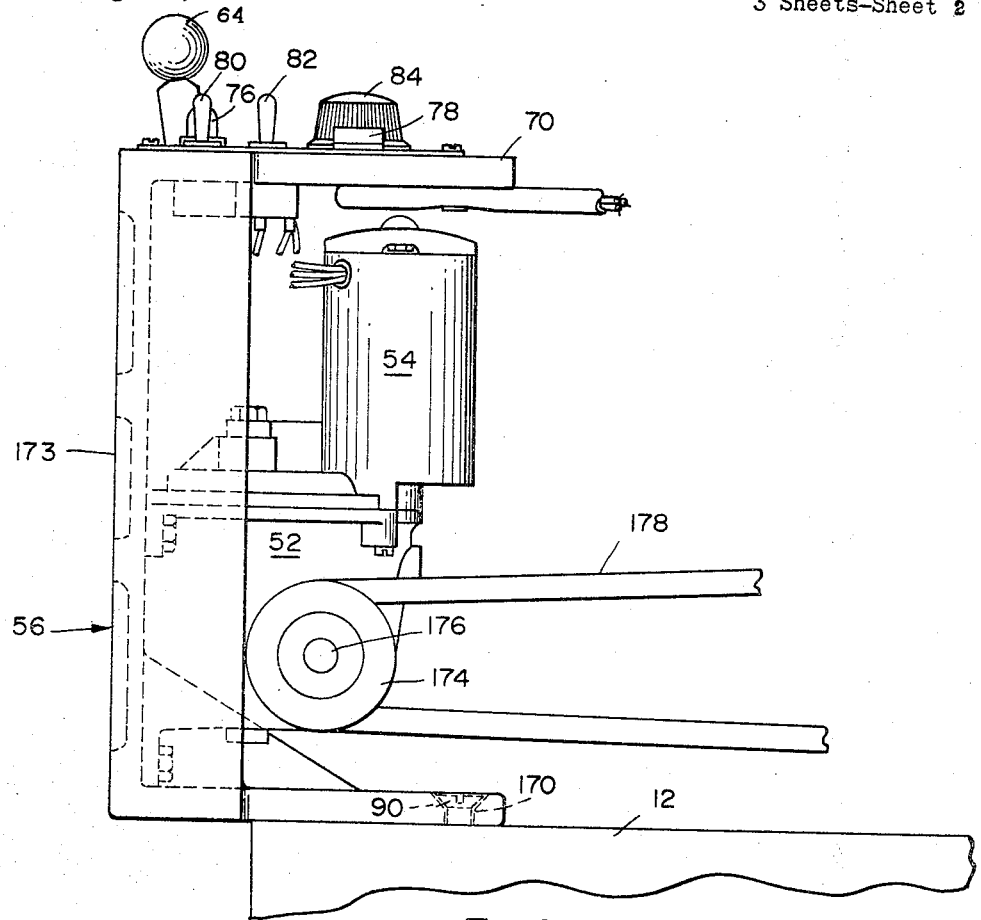
FIG. 7 is an elevational view of the power feed device mounted on the milling machine table for use as a power take-off device for auxiliary equipment.

Power feed device 10 may also be used to provide a power take-off for running auxiliary equipment on the milling machine as shown in FIG. 7. For this type of application the housing is positioned so that its rear wall 71 rests on the milling machine table 12. It is locked in place by bolts 90 and 92 which engage nuts 98 and 100 disposed in channels 102 and 104. Bolts 90 and 92 extend through countersunk bores 170 and 172 (FIG. 3) in wall 71. A pulley 174 is provided on the miter box output shaft 50 on the end opposite the end to which gear 48 is attached or else to a second miter box output shaft 176 as shown which extends outwardly from the miter box on the side opposite to that at which gear 48 is located. The pulley 174 thus provides an additional power take-off point separate from gear 48. A portion of a belt 178 is shown which may be connected to a pulley on auxiliary equipment (not shown) attached to table 12. By way of example the auxiliary equipment may be a turntable holding a workpiece to be worked on by appropriate tools held by spindle 26. With the arrangement shown in FIG. 4, the auxiliary equipment may be driven either by means of gear 40 or pulley 174.

It should be appreciated that the power transmission function provided by gears 48, 58, and 40 may be provided by other equivalent means. For example, gears 40 and 48 could be replaced by pulleys interconnected by a loose fitting belt, and gear 58 could be replaced by a tension wheel which when brought to bear on the loose-fitting belt would remove the slack in the belt so that the pulley replacing gear 48 will directly drive the pulley replacing gear 40.

Other embodiments will occur to those skilled in the art and are contemplated to be within the following claims.

What is claimed is:

1. Power feed apparatus adapted for connection with a milling machine having a moveable table, means including a feed screw for moving said table parallel to the axis of said screw, and a gear mounted on one end of said feed screw, said apparatus comprising:
 a housing adapted for mounting on said moveable milling machine table,
 a motor supported by said housing,
 power transmission means supported by said housing and driven by said motor, said power transmission means having an output gear driven by said motor, and
 manually actuable power applying means for appplying the power from said power transmission means to said feed screw gear so as to rotate said feed screw, said power applying means comprising a lever pivotally mounted to said housing and an idler gear rotatably mounted on said lever, said lever being moveable on its pivot between a first position wherein said idler gear is disengaged from said output gear and a second position wherein said output gear is engaged with said output gear, said lever and idler gear being located with respect to said housing so that when said housing is mounted on said milling machine table said idler gear will be disengaged from said feed srew gear with said lever in said first position and engaged with said feed screw gear with said lever in said second position.

2. The apparatus of claim 1 in which said output gear is rotatable on a first axis and said idler gear is rotatable on a second axis which is parellel to said first axis, said power transmission means and said lever disposed so that said first and second axes extend parallel to the axis of said feed screw when said housing is mounted on said milling machine table.

3. The apparatus of claim 2 in which said drive means further includes a motor control circuit comprising:
 a reversing switch for establishing current flow in said motor in either of two directions for causing said motor to rotate in one of two directions,
 a semi-conductor device for controlling current flow through said motor, and
 variable electrical impedance means connected to a central terminal of said semi-conductor device for governing current flow through said semi-conductor device.

4. The apparatus of claim 1 in which said housing includes a pair of side walls and a top wall with said top wall adapted to rest on said milling machine table, and means carried by said top wall adapted for mounting in T slots in said milling machine table so as to lock for locking said housing to said table.

5. The apparatus of claim 1 wherein said power transmission means has an output means adapted for use as a power take-off for auxiliary equipment used with a milling machine.

6. The apparatus of claim 1 in which said lever has a handle at one end for moving it from one to the other of said first and second positions, and further wherein said idler gear is mounted on said lever between its pivot point and said handle.

7. A power feed unit adapted for connection to a milling machine of the type having an elongate horizontally extending table, means supporting the table for reciprocal movement along its longitudinal axis, means including a rotatable feed screw for effecting movement of the table along its longitudinal axis, and a feed screw drive gear mounted on one end of said feed screw, said unit comprising:
 a housing having a top wall and spaced side walls and open at one end thereof so as to accommodate one end of a milling machine table between said side walls, said top wall also having at least one opening therein for means to fasten said housing to said table;
 a motor attached to said housing;
 power transmission means within said housing comprising an output gear driven by said motor;
 a lever, means within said housing pivotally securing said lever to said housing, one end of said lever being accessible outside of said housing for pivotal movement by an operator, and
 an idler gear rotatably mounted on said lever between its pivot point and said one end thereof, said idler gear having its axis of rotation extending parallel to the axis of rotation of said output gear and being disposed so that with said housing attached to said table said idler gear is moveable by pivotal movement of said lever from a first position in which it is out of engagement with said feed screw gear and said output gear and a second position in which it is engaged with said feed screw gear and said output gear.

8. In combination with a machine having an elongate horizontally extending table, means supporting the table for reciprocal movement along a horizontal axis, means including a rotatable feed screw for effecting movement of said table along said horizontal axis, and a feed screw drive gear attached to one end of said feed screw, a power feed unit for rotating said feed screw so as to effect movement of said table, said unit comprising:
 a housing having a top wall and a pair of spaced side walls, said housing mounted on one end of said table with said top wall overlying said table;
 means releasably securing said housing to said table;
 a motor carried by said housing;
 power transmission means within said housing comprising an output gear driven by said motor;
 a lever having a pivotal connection to an interior portion of said housing, one end of said lever extending outside of said housing; and
 an idler gear rotatably attached to said lever between its pivot and said one end thereof, said idler gear mounted so that its axis of rotation is parallel to the axes of rotation of said feed screw drive gear and said output gear, said idler gear located on said lever so as to be moveable by pivotal movement of said lever between a first position in which it is disengaged from said feed screw drive gear and said output gear and a second position in which it is in engagement with said feed screw drive gear and said output gear and is effective to transmit power from said output gear to said feedscrew drive gear.

9. Power feed apparatus for rotating the feed screw of a milling machine comprising:
 a housing adapted for mounting on the table of a milling machine,
 drive means supported by said housing,
 first power transmission means driven by said drive means, said first power transmission means having a first gear rotatable on a first axis,
 second power transmission means spaced from said first power transmission means and arranged for rotating a feed screw of a milling machine, said second power transmission means comprising a second gear rotatable on a second axis parallel to said first axis, and
 manually actuatable power applying means for applying the power from said first power transmission means to said second power transmission means, said power applying means including an idler gear and a lever pivotally mounted to said housing rotatably supporting said idler gear for moving said idler gear between a first position in which it engages both said first and second gears and transmits power from said first gear to said second gear and a second position in which said idler gear is disengaged from at least one of said first and second gears, said idler gear being mounted on said lever between its pivot point and one end thereof.

References Cited

UNITED STATES PATENTS

| | | | |
|---|---|---|---|
| 1,558,525 | 10/1925 | Williams | 51—231 |
| 2,069,701 | 2/1937 | Emmons | 90—21 |
| 3,021,719 | 2/1962 | Conrad | 74—405 X |
| 3,307,255 | 3/1967 | Hubrich | 30—4 |

GIL WEIDENFELD, Primary Examiner

U.S. Cl. X.R.

51—231, 240; 74—354; 90—58